United States Patent

Saito et al.

[15] 3,706,853

[45] Dec. 19, 1972

[54] TIME DIVISION COMMUNICATION APPARATUS

[72] Inventors: Noriaki Saito; Shinsuke Kadota, both of Tokyo, Japan

[73] Assignee: Nippon Electric Company, Limited, Tokyo, Japan

[22] Filed: Feb. 24, 1971

[21] Appl. No.: 118,323

[52] U.S. Cl...........................179/15 AL, 178/67.5 R

[51] Int. Cl...............................................H04j 3/08

[58] Field of Search...179/15 AL, 15 BS; 178/69.5 R

[56] References Cited

UNITED STATES PATENTS 3,529,089 9/1970 Davis..............................179/15 AL

*Primary Examiner*—Ralph D. Blakeslee

*Attorney*—Hopgood & Calimafde

[57] ABSTRACT

A time division communications system employs central control apparatus for effecting bilateral signaling for a plurality of cascaded system stations. Each station includes receiving and transmitting apparatus for receiving and inserting pulses occurring in a particular time interval of a composite pulse train sequence. The central control unit changes the relative position of the incoming and outgoing pulse digits to effect a desired communications interconnection pattern between the system stations.

4 Claims, 8 Drawing Figures

*INVENTORS*
NORIAKI SAITO
SHINSUKE KADOTA
*by*
Sandoe, Hopgood & Calimafde
ATTORNEYS INVENTORS
NORIAKI SAITO
SHINSUKE KADOTA
by
Sandoe, Hopgood & Calimafde
ATTORNEYS

INVENTORS
NORIAKI SAITO
SHINSUKE KADOTA by
Sandoe, Hopgood & Calimafde
ATTORNEYS

TIME DIVISION COMMUNICATION APPARATUS

The present invention relates to time division communication apparatus and, more specifically, to such apparatus using a delta modulation system which is one form of a PCM time division arrangement.

When one transmission circuit has heretofore been utilized in common by a large number of substations, a time division system, for example, employing pulse code modulation (PCM), has been often used.

In a conventional time division system, it was required that circuits between the time division multiplex device (central controlling device) and each peripheral device (substations) be connected via mutually independent lines. Accordingly, when the peripheral stations are located at different places, the economical merit of multiplexing is much reduced.

It is therefore an object of the present invention to eliminate the above-discussed disadvantage in situations where the substations are distributed at long distances from the common multiplex apparatus.

According to the present invention, a time division communication device comprises a central controlling device, a plurality of substations, each of which includes transmitting and receiving apparatus, the transmitting devices being connected by transmission lines in cascade and the receiving devices also being connected by transmission lines in cascade, the receiving and transmitting apparatus in the end substation being connected to each other, the pulse train included in the transmission signal transmitted from and to the central controlling device having one time slot for frame synchronizing pulses and additional time slots of a number corresponding to the number of substations, the central controlling device effecting the functions of providing a frame synchronizing pulse in its proper time slot, and of interchanging a transmission pulse present during one time slot into another time slot assigned to another substation, each of the receiving devices performing the functions of extracting a pulse during the time slot following the frame synchronizing pulse in the received pulse train, shifting the frame synchronizing pulse to the time slot after extracting the pulse formerly thereat, and of sending the resulting pulse train to the next substation through the transmission line. Each of the transmitting devices accomplishes the functions of shifting the pulses present during the time slot intervals following the frame synchronizing pulse to next time slots, inserting the outgoing pulse to be transmitted from the substation to the time slot following to the frame synchronizing pulse, and sending the resulting pulse train to the next substation through the transmission line.

Further objects and features of this invention will be readily understood from the following detailed description of an embodiment of the present invention, presented hereinbelow in conjunction with the accompanying drawings, in which.

The principle of the present invention will be explained, referring first to FIGS. 1 and 2.

Figure 1:
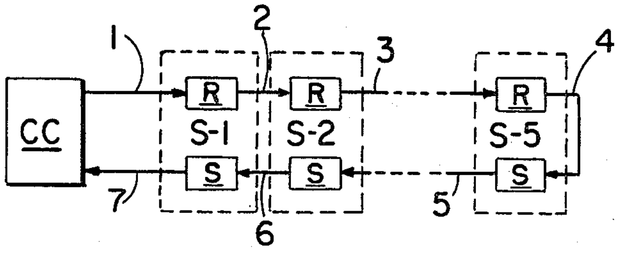
FIG. 1 is a block diagram of an embodiment of the present invention.

In FIG. 1, S–1, S–2, . . . S–5 are substations connected by one transmission circuit to each other. One end 1 of the transmission link is connected to a central controlling device CC. Therefore, the circuits between the central controlling device CC and each of the substations are mutually dependent. Communications between the substations are effected on a time division basis, for example, employing a time period (time slot) for each substation together with a time slot for a synchronizing pulse. Each of the substations S–1, S–2, . . . S–5 includes a receiving circuit R and a transmission circuit S.

Figure 2:
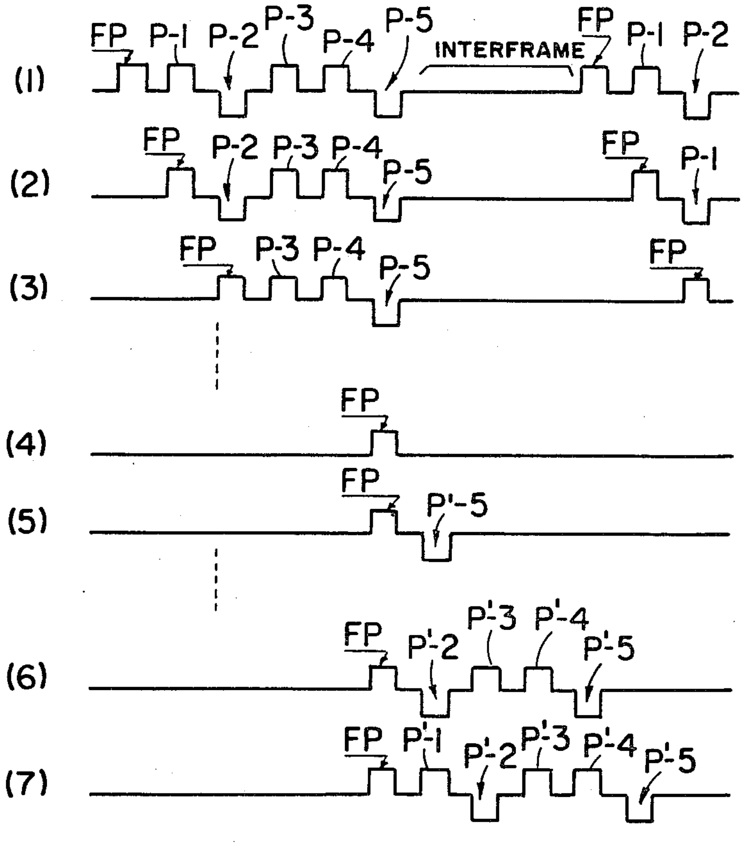
FIG. 2 shows waveforms characterizing transmission signals at various points of the circuit depicted in FIG. 1.

In FIG. 2, the pulse train shown in FIG. 2(1) depicts the wave form at the point 1 in FIG. 1; the pulse train of FIG. 2 (2) shows the wave form at the point 2 in FIG. 1; the pulse train (3) in FIG. 2 shows the wave form at the point 3 in FIG. 1; the pulse train (4) in FIG. 2 shows the wave form at the point 4 in FIG. 1; the pulse train (5) in FIG. 2 shows the wave form at the point 5 in FIG. 1; the pulse train (6) in FIG. 2 shows the wave form at the point 6 in FIG. 1; and the pulse train (7) in FIG. 2 shows the wave form at the point 7 in FIG. 1.

The frame synchronizing pulse FP of FIG. 2 is a pulse signaling the initiation of a pulse sequence block. Successive pulse blocks are separated by a period free of pulses, which is referred to as the INTER FRAME interval in FIG. 2. One pulse train frame thus comprises FP, P–1, P–2, P–3, P–4 and P–5 pulses. The pulse P–1 in FIG. 2 is assigned to the receiving circuit R of the substation S–1; P–2 is a pulse assigned to R of S–2; P–3 is a pulse assigned to R of S–3; P–4 is a pulse assigned to R of S–4; and P–5 is a pulse assigned to R of S–5. P′–1 is a pulse transmitted from the transmitter portion S of S–1; P′–2 is a pulse transmitted from transmitter S of S–2; P′–3 is a pulse transmitted from transmitter S of S–3; P′–4 is a pulse transmitted from transmitter S of S–4; and P′–5 is a pulse transmitted from transmitter S of S–5.

The pulse train of FIG. 2(1) is delivered to the substation S–1 from the central controlling device in FIG. 1. In the receiving circuit R of S–1, the pulse P–1 next to the frame synchronizing pulse FP is extracted as the received pulse of S–1 and delivered to a known delta demodulation circuit. The pulse may then be converted, for example, into an audio signal. At the same time, at the receiver R of S–1, the frame synchronizing pulse is shifted to the time slot or the position of the P–1 pulse and the pulse train of FIG. 2(2) is sent out to the second substation S–2. At station S–2, P–2 is extracted by an operation similar to that effected by S–1, and the receiver R of S–2 delivers the pulse train of FIG. 2(3) to the third substation S–3. By similar operations effected at S–3, S–4, S–5, the output of the receiver R in the final terminal S–5, i.e., the signal at the point 4 in FIG. 1, becomes only the frame synchronizing pulse as shown in FIG.2(4).

The output side of the receiver R in substation S–5 is connected to the input of the transmission circuit S of the station S–5 as shown in FIG. 1. The transmitting device S of S–5, upon receiving the frame synchronizing pulse of FIG. 2(4) actuates the delta modulation circuit thereof, converts the signal to be transmitted, for example, an audio signal, into a pulse, and inserts this pulse into the P′–5 pulse position shown in FIG. 2(5). The wave of FIG. 2(5) is then delivered to the substation S–4. The transmitter portion S of the substation S–4 shifts the P′–5 pulse of FIG. 2(5) backward by one time slot, inserts the delta-modulated pulse P′–4 to the position where P′–5 was situated, by similar operation to that given above, and delivers the resulted pulse train to S–3. Accordingly, the delivered pulse train has an FP pulse, P′–4 pulse, and P′–5 pulse in this order.

The transmitter S of the substation S–3, upon receiving this pulse train, backwardly shifts the P′–4, P–5 pulses by one time slot in a manner discussed above, inserts a delta-modulated information pulse P′–3 in the position previously occupied by the P′–4 pulse, and delivers this pulse train to substation S–2. Accordingly, the delivered pulse train has FP pulse, P′–3 pulse, P′–4 pulse and P′–5 pulse in this order.

At the transmitter S of the substation S–2, the pulse P′–2 of S–2 which has been delta-modulated by similar operation is inserted as shown in FIG. 2(6), and the resulting pulse train is delivered to the substation S–1. At the substation S–1, the pulse P′–1 of S–1, which has been delta-modulated as before, is inserted as shown in FIG. 2(7), and is delivered to the central controller CC. This pulse train is equivalent to the pulse train obtainable by a time division multiplex device which is known in prior art.

Illustrative apparatus for carrying out communications in the above-described manner will be explained by the following.

Assuming, for example, that communication between substation S–1 and substation S–5 is to be performed, pulses P′–1 and P′–5, shown in FIG.2(7) comprise information sent out from substations S–1 to S–5 and vice-versa. These pulses are exchanged to supply information from S–5 to S–1 and from S–1 to S–5 at the central controlling device CC.

Figure 3:
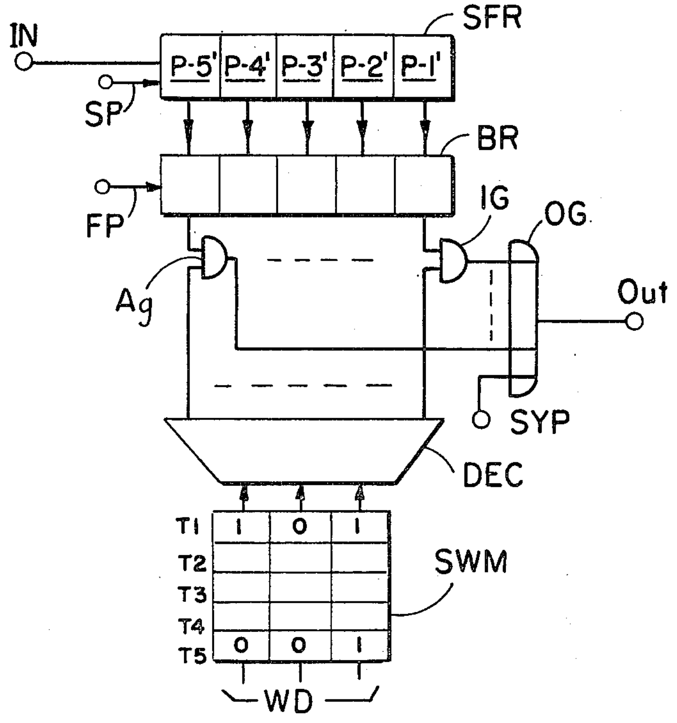
FIG. 3 shows a circuit diagram of the central controlling device in FIG. 1.
Figure 4:
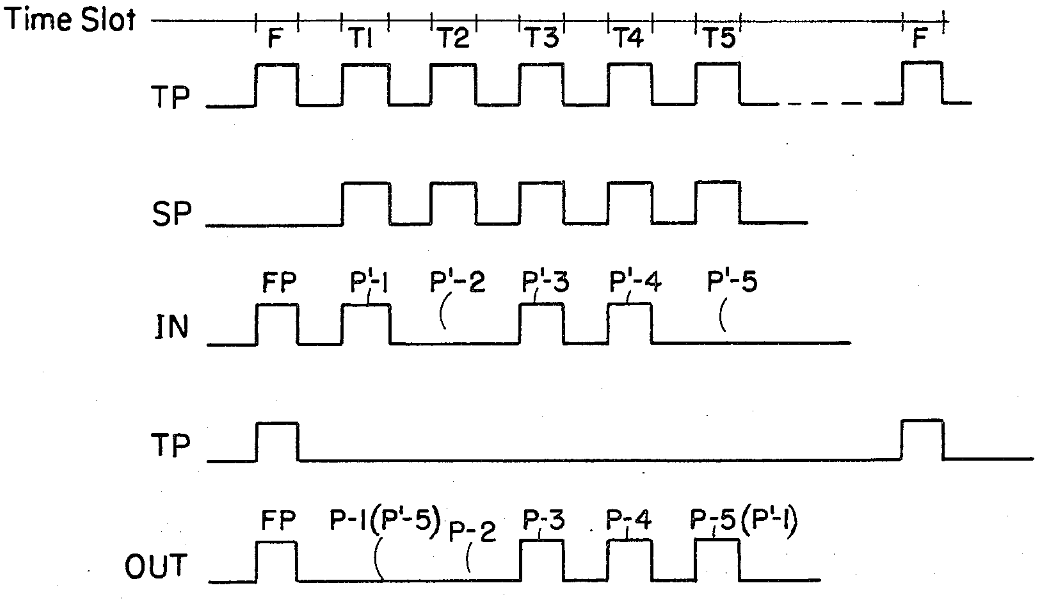
FIG. 4 shows waveforms of signals at various points in the circuit of FIG. 3.

FIG. 3 and FIG. 4 depict the time slot exchanging function effected by the central controlling device CC. The operation is described hereinafter, referring to these drawings. The FIG. 3 structure includes a shift register SFR, a buffer register BR, AND gates AG, an OR gate OG, a converter (decoder) DEC for converting a binary code into a decimal code (an enabled output decimal digit), a memory device SWM for storing time slot exchanging information, a shift pulse terminal SP for driving the shift register SFR, a timing pulse terminal FP for transferring information stored in the shift register SFR to the buffer register BR, an input terminal IN, an output terminal OUT, a write-in terminal WD for writing time slot exchanging data into the memory SWM. In FIG. 4, a timing waveform TP shows locations of the time slots, and $T_1$ to $T_5$ are time slot designations. SP, IN, FP and OUT respectively identify waveforms at the terminals identified by the same reference marks in FIG. 3, and SYP represents a synchronizing pulse.

Bipolar pulses received at the controller CC are converted into unipolar pulses therein, to form the waveform IN shown in FIG. 4, and each pulse is read into the register SFR in the time slot order.

After input pulse information for one frame, i.e., after information corresponding to the time slots $T_1$ to $T_5$ is stored in register SFR, when a frame synchronizing pulse is received, the information in the shift register SFR is transferred to the buffer register BR. Since the memory SWM stores previously generated time slot exchanging information supplied thereto through the write-in terminal WD from well known controlling apparatus (not shown), these stored information words are read out periodically and sequentially by the waveform SP shown in FIG. 4. Therefore the contents of the word $T_1$ of the memory SWM (FIG. 3) at the timeslot $T_1$ (FIG. 4) and the word $T_5$ of the memory SWM at the timeslot $T_5$ are respectively read out. Each stored word identifies the time slot number of a pulse to be transmitted to the substation corresponding to that word. For example, in FIG. 3, when the communication between the substation S–1 and S–5 is performed, the stored word $T_1$ comprises the time slot number 5, and $T_5$ stores the number 1, respectively. Accordingly, as the time slot $T_1$, the binary code of the number 5 (the word $T_1$) is read out and is decoded into a decimal number, i.e., it energizes a selected output of the converter DEC corresponding to the decimal number 5. The converted information drives the one element of the gate array AG, and the information content of the fifth bit, i.e., P′–5 stored within the buffer BR is therefore sent out to the output terminal OUT through the selected gate AG and the OR gate OG for end delivery to the substation S–1. Similarly, during the time slot $T_5$, the number 1 is read out and the information signal P′–1 is sent out at the terminal OUT. At the frame synchronizing time slot, the synchronizing pulse is sent out from the terminal SYP. Therefore the pulse train which has the waveform shown at OUT of FIG. 4 appears on the output terminal OUT.

The pulses emanating from the terminal OUT are converted by a U → B (unipolar to bipolar) converter to comprise pulses as shown in FIG. 2. Thereafter, the pulses are supplied to each substation, the information signal P′–1 during each frame is received at the substation S–5 (FIG. 1), and the information digits P′–5 are received at the substation S–1. Bilateral communication is thereby effected between S–1 and S–5.

An example of receiving circuit R in each of the substations S–1 to S–5 will next be described referring to FIG. 5. Each receiver includes a line equalizer A for compensating variation of loss characteristic due to dispersions in the length and attenuation of the transmission line, a pulse regenerating circuit B for reforming the received, distorted pulse wave form and regenerating the original pulse wave form, a circuit C for interdicting the pulse at the time slot assigned to the particular substation, shifting the frame synchronizing pulse to the time slot assigned to the substation, and delivering the resulting pulse train to the line, a timing circuit D for detecting the position of the pulse assigned to the particular substation, a demodulator circuit E for demodulating the pulse in the pulse position indicated by the circuit D for inclusion in the output signal, for example, the audio signal, and transfer of the pulse information to an output circuit G, and an output circuit G, for example, an ear receiver.

The wave form of the pulse train transmitted from the transmission line, for example, the pulse train of FIG. 2(1) is distorted by the effects of the transmission line. The distortion of the wave form of the input pulse train is removed by the equalizer and regenerator circuits A and B, and the original wave form is reformed.

The reformed pulse train is applied to the timing circuit D which includes a timing circuit for detecting interframe time portions and a discriminating circuit for signaling the pulse-position assigned to the particular substation, i.e., the next pulse-position following the frame synchronizing pulse. When an input pulse is not detected in a predetermined time, the timing circuit D for interframe discrimination operates, and the discriminating circuit for detecting the incidence of the pulse position assigned to the particular substation is actuated. The discriminating circuit for pulse position, upon detecting the frame synchronizing pulse in the pulse train, actuates the circuit C. When the circuit C is actuated by the timing circuit D, it delays the frame synchronizing pulse received at the first time slot, and shifts this pulse to the second time slot. The circuit C also suppresses the pulse which was present during the second time slot. The succeeding data pulses and the shifted frame synchronizing pulse are then delivered to the line. When the demodulator E is actuated by timing circuit D, the circuit E receives the pulse following the synchronizing pulse, i.e., the pulse assigned to the substation. The circuit E generates an output signal, for example, an audio signal, and operates the output circuit G, for example, an ear receiver.

Figure 6:
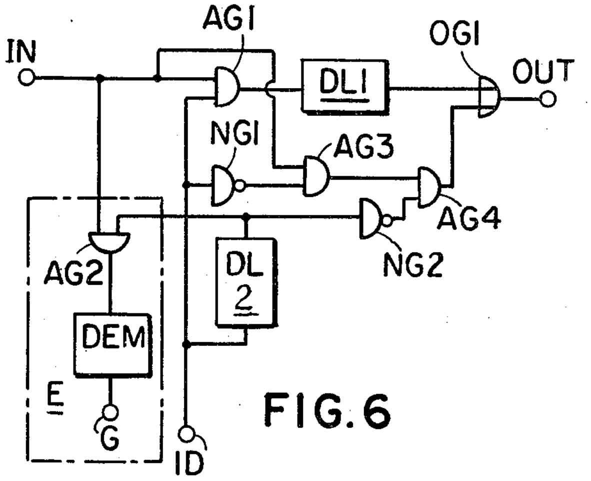
FIG. 6 shows circuit diagram of one part in the receiving apparatus of FIG. 5.

Circuitry for the elements C and E for extracting pulses for the substation and for shifting the frame synchronizing pulse are described in detail, referring to FIG. 6.

Figure 5:
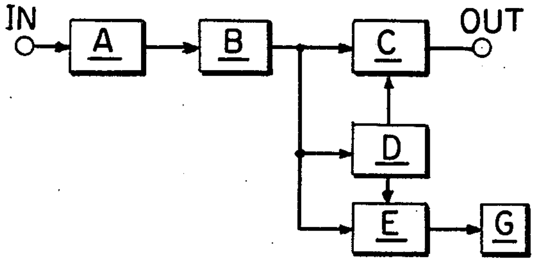
FIG. 5 shows a block diagram of receiving apparatus for each substation in FIG. 1.

In FIG. 6, the portion enclosed with a dotted line corresponds to the demodulator E in FIG. 5, and the other portion corresponds to circuitry C. The circuit C includes AND gates AG 1–4, NAND gates NG 1 and 2, a one-time slot delay circuit DL, a D–A demodulator DEM, an OR gate OC, the terminal IN to receive an input from the regenerator B in FIG. 5, the terminal OUT is the output to the transmission line as through a transmission line driver circuit (not shown), a terminal G for sending an analog output to the output element G of FIG. 5, and a terminal D for receiving a timing pulse from timing circuit D of FIG. 5.

Assuming that a device shown in FIG. 6 is located at the substation S–1 in FIG. 1, a pulse train supplied at the input terminal IN of FIG. 6 takes the waveform shown in FIG. 2(1), and a timing pulse at the terminal D is a pulse of the same phase as the frame synchronizing pulse in FIG. 2(1).

A pulse occurring during the second time slot within a pulse train supplied at the terminal IN, i.e., pulse P–1 is extracted by the gate $AG_2$ which also receives the pulse from the terminal D at this second time slot by way of a one time slot delay circuit DL 2. After the extracted pulse is demodulated into an analog signal by the digital-analog demodulator DEM, the demodulated signal is coupled to the output element G. Also, during the pulse train supplied at the terminal IN, the single frame synchronizing pulse enables the gate $AG_1$. The other information pulses are extracted at the output of the gate $AG_3$, and both sets of extracted pulses are sent to and through the output OR gate, except that the pulse P–1 occurring during the second time slot $T_1$ and supplied from the gate $AG_3$ to the gate $AG_4$ is suppressed by the gate $NG_2$.

Since the frame synchronizing pulse from the gate $AG_1$ is delayed for one time slot by the delay $DL_1$, this pulse is shifted to the time slot previously occupied by the pulse P–1, and is sent out to gate $OG_1$. This shifted pulse is combined with the transmission pulses from the gate $AG_4$ via the OR gate $OG_1$ to form a pulse train having the waveform shown in FIG. 2(2).

Next, an example of a transmitting circuit S constituting each substation S–1 to S–5 will be described referring to FIG. 7. The transmitting circuit S comprises a line equalizer A explained with reference to FIG. 5 and a pulse regenerating circuit B, also heretofore discussed. The circuit S further includes a delay circuit K for one pulse period duration, a detecting circuit M for detecting the frame synchronizing pulse, a modulating circuit P, an input circuit N, for example, a transmitter, a circuit L for delivering an augmented replica of the input pulse train to the line, i.e., as supplemented with a pulse from the particular substation. The incoming pulse train from the transmission line, such as in FIG. 2(4) is made free of distortion and is regenerated to its original wave form. The reformed pulse train is applied to the detector circuit M which comprises a timing circuit for detecting the interframe intervals in FIG. 2, and a detecting circuit for signaling the incidence of the frame synchronizing pulse. When an input pulse is not detected in more than a predetermined time, the timing circuit for detecting the interframe interval operates, and the detecting circuit for the frame synchronizing pulse is actuated. Upon detection of the frame synchronizing pulse, the detecting circuit for the frame synchronizing pulse actuates the circuit L. The modulator P is actuated at a time delayed by one time slot to detect the state of input circuit N, and to modulate it into an information pulse. This pulse is delivered to the circuit L which delivers the pulse of the particular substation to the line, following the frame synchronizing pulse. The input data pulse train, delayed for one pulse interval by the circuit K, is then sequentially delivered to the line through L.

Figure 7:
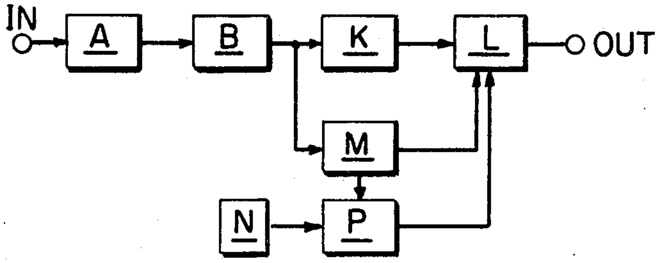
FIG. 7 shows a block diagram of the transmitting device of each substation of FIG. 1.
Figure 8:
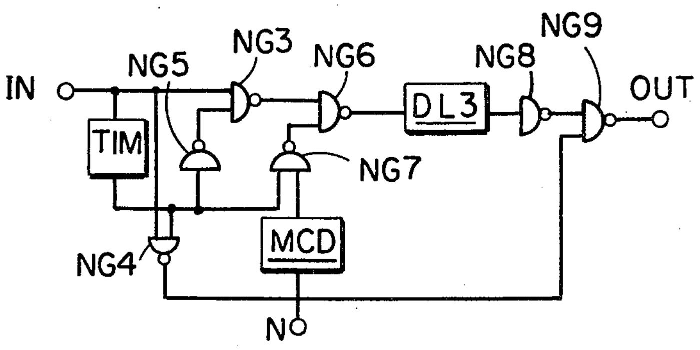
FIG. 8 shows circuit diagram of one part in the transmitting device of FIG. 7.

FIG. 8 shows the circuit elements K, L and M in FIG. 7 in detail. In FIG. 8, there is shown a circuit TIM which generates a pulse of the same phase as the frame synchronizing pulse, thereby identifying the location of the frame synchronizing pulse within the input pulse array, a modulator MOD converts an analog signal from the input circuit N in FIG. 7 into a digital signal, a one time slot delay circuit DC 3, NAND gates NG, a terminal IN comprising an input terminal for receiving pulses from the element B in FIG. 7, an output terminal OUT for forwarding output pulses to a following station through a transmission line driver circuit (not shown), and an input terminal N for receiving the analog signal from the circuit N in FIG. 7.

The corresponding relation between the structure of FIG. 7 and FIG. 8 is as follows. Circuit TIM in FIG. 8 corresponds to the circuit M in FIG. 7, the modulator MOD and the gate NG 7 corresponds to the circuit P, the other circuitry corresponds to the circuit L.

In FIG. 8, a frame synchronizing pulse is extracted from the input pulse train at the terminal IN by the circuit TIM, and thereafter, this pulse is supplied to gates $NG_4$, $NG_5$ and $NG_7$.

Assuming that the FIG. 8 circuitry is located at the station S–1 of FIG. 1, the output pulse train from the gate $NG_3$ comprises a wave form in which the incident synchronizing pulse is removed from the pulse train of FIG. 2(6). The output pulse of the gate $NG_7$ comprises a wave form in which only the pulse P'–1 is present at the location of the frame synchronizing pulse of FIG. 2(6). Therefore, at the gate $NG_6$, these two pulse trains are combined, forming a pulse train in which the transmission pulse P'–1 is inserted in lieu of the synchronizing pulse in FIG. 2(6).

Outgoing pulses from the gate $NG_6$ are delayed for one time slot by the delay element $DL_3$, to form the pulse train in which the synchronizing bit from FIG. 2(7), is removed.

Correspondingly, the gate $NG_4$ extracts only the frame synchronizing pulse from the regenerated pulse train and supplies its output to the gate $NG_9$ without delay. The gate $NG_9$ combines the delayed pulses from the delay element $DL_3$ and the synchronizing pulse supplied thereto without delay to obtain the pulse train shown in FIG. 2(7).

These above-described system operations are similarly performed in the other substations. As described above, according to the present invention, each substation can thus readily extract and insert subscriber information repeating pulses as required. An economical communication system is therefore formed in a communication network wherein subscribers may be physically scattered.

In FIG. 1, the central controller CC is shown as including only one time slot exchanging circuit. However, a plurality of such circuits may be accommodated by adding switching apparatus as required. Also, a plurality of subscribers may be accommodated by each substation equipment arrangement by adding a line concentrator.

We claim:

1. Time division communication station apparatus for responding to a signal wave comprising a frame synchronizing pulse and at least one information pulse, a predetermined one of said information pulses being associated with a particular signaling station, said apparatus including means for extracting said predetermined one of said information pulses, means for deleting said frame synchronizing pulse, means for generating an effective revised frame synchronizing pulse during the time position previously occupied by said predetermined information pulse, and means for supplying an apparatus output wave corresponding to said input wave modified to delete said incoming frame synchronizing pulse and said predetermined information pulse and having added thereto a revised frame synchronizing pulse in the time position previously occupied by said predetermined information pulse.

2. A combination as in claim 1 further comprising plural cascaded station apparatus, each station apparatus further comprising transmitting means for collectively generating an output pulse train including plural information pulses, and central processing means including means for receiving said output pulse train and for supplying said signal wave.

3. A combination as in claim 2 wherein said central processing means includes means for selectively changing the digit positions of said information pulses in said signal wave vis-a-vis the digit positions of said information pulses in said output pulse train.

4. A combination as in claim 3 wherein said position changing means includes plural stage series to parallel converter and latch buffer means, an output port, plural gate means for selectively connecting said latch buffer stages to said output port, and station interconnection storage means for sequentially enabling said gate means.

* * * * *